United States Patent
Schulte et al.

(10) Patent No.: US 10,158,323 B2
(45) Date of Patent: Dec. 18, 2018

(54) PHOTOVOLTAIC MODULE CLIP

(71) Applicant: SUNPOWER CORPORATION, San Jose, CA (US)

(72) Inventors: Elizabeth Dix Schulte, Oakland, CA (US); Brian Wares, San Francisco, CA (US); Nicholas James McKibben, Oakland, CA (US)

(73) Assignee: SunPower Corporation, San Jose, CA (US)

(*) Notice: Subject to any disclaimer, the term of this patent is extended or adjusted under 35 U.S.C. 154(b) by 162 days.

(21) Appl. No.: 15/254,980

(22) Filed: Sep. 1, 2016

(65) Prior Publication Data

US 2018/0062568 A1    Mar. 1, 2018

(51) Int. Cl.
| | |
|---|---|
| H02S 30/10 | (2014.01) |
| H02S 20/32 | (2014.01) |
| H02S 40/30 | (2014.01) |
| F16B 2/22 | (2006.01) |
| F16B 7/04 | (2006.01) |
| F16B 2/24 | (2006.01) |

(52) U.S. Cl.
CPC ............... *H02S 30/10* (2014.12); *F16B 2/22* (2013.01); *H02S 20/32* (2014.12); *H02S 40/30* (2014.12); *F16B 2/245* (2013.01); *F16B 7/0493* (2013.01)

(58) Field of Classification Search
CPC .......... H02S 30/10; H02S 20/32; H02S 40/30; F16B 2/22
USPC ........................................................ 136/246
See application file for complete search history.

(56) References Cited

U.S. PATENT DOCUMENTS

| | | |
|---|---|---|
| 6,672,018 B2 | 1/2004 | Shingleton |
| 8,757,567 B2 | 6/2014 | Ciasulli et al. |
| 2017/0025989 A1* | 1/2017 | Shaw .................... F24J 2/523 |
| 2017/0033730 A1* | 2/2017 | Almy .................... H02S 20/23 |

* cited by examiner

*Primary Examiner* — Jayne L Mershon
(74) *Attorney, Agent, or Firm* — Schwabe, Williamson & Wyatt, P.C.

(57) ABSTRACT

A photovoltaic (PV) module clip, and methods of fastening a PV module to a structural member using the PV module clip, are described. In an example, a PV module clip includes a toe portion interconnected with several legs by a neck portion. The toe portion may be inserted through several aligned holes of a PV module frame and a mounting assembly strut to an underside of the strut. The neck portion may extend upward from the toe portion through the aligned holes to the legs above the strut. The legs may extend around a portion of the strut in a tensioned state, and engage with a retaining feature to hold the legs in the tensioned state. Accordingly, the legs may clamp the PV module to the mounting assembly.

12 Claims, 8 Drawing Sheets

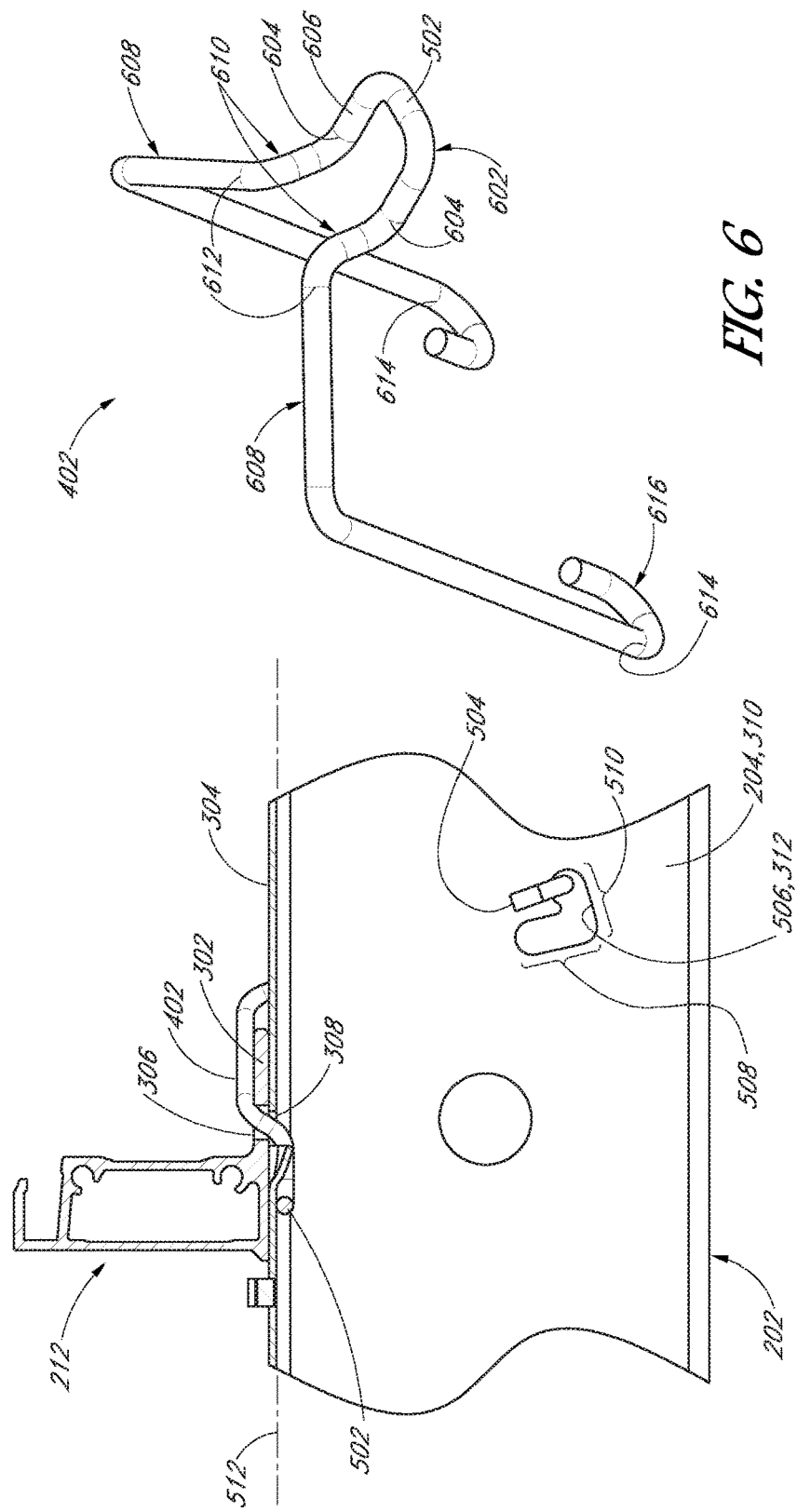

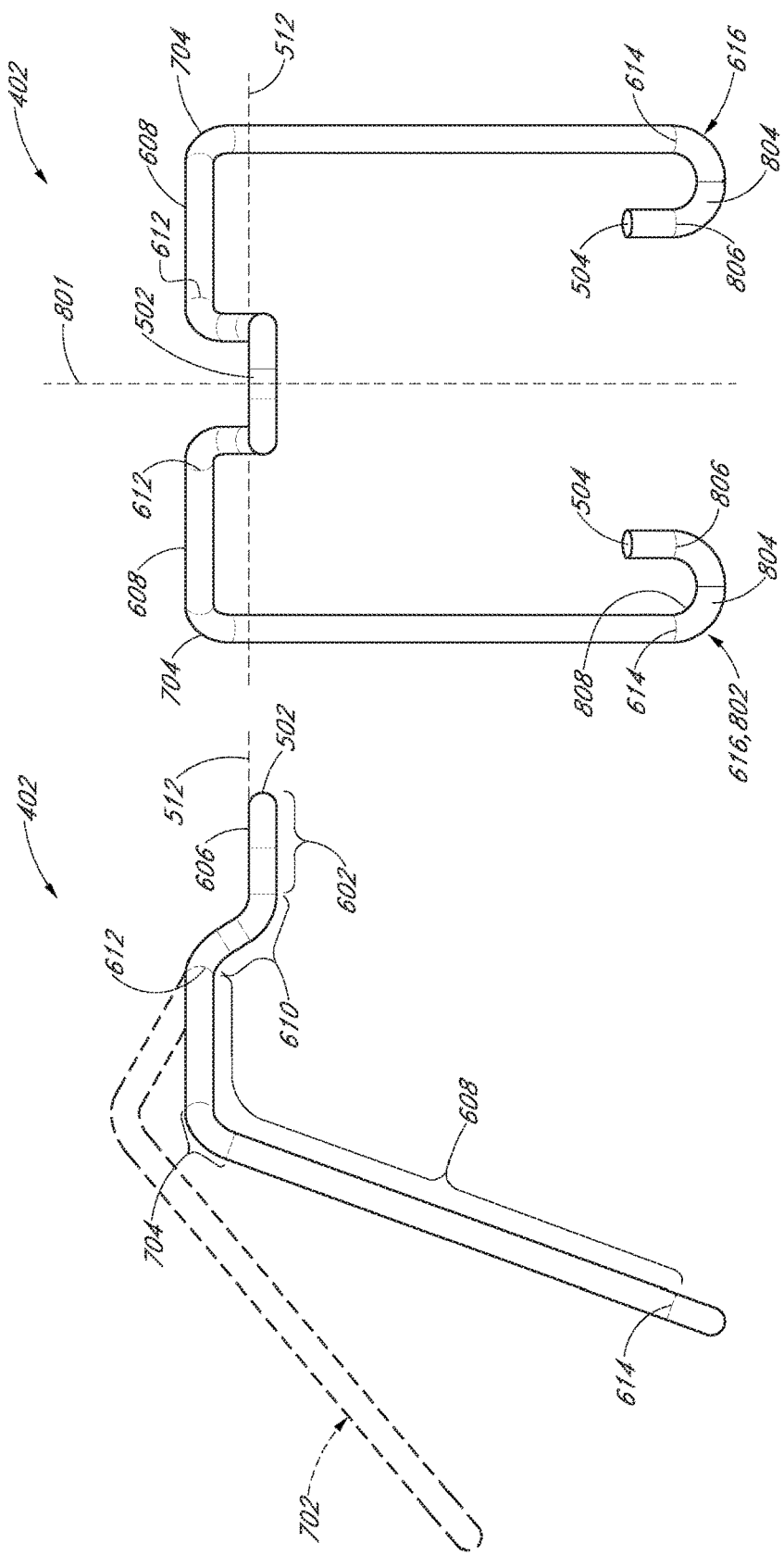

PHOTOVOLTAIC MODULE CLIP

BACKGROUND

Some sun-tracking solar power systems, such as utility-scale PV installations, are designed to pivot a large number of solar modules to track the movement of the sun. For example, sun-tracking solar power systems may include rows of PV modules supported on respective torque tube assemblies. The PV modules are commonly attached to the torque tube assemblies using conventional fasteners, such as bolts or rivets.

BRIEF DESCRIPTION OF THE DRAWINGS

FIG. 5 illustrates a section view of a PV module clip fastening a PV frame to a strut, in accordance with an embodiment of the present disclosure.

FIG. 6 illustrates a perspective view of a PV module clip, in accordance with an embodiment of the present disclosure.

FIG. 7 illustrates a side view of a PV module clip, in accordance with an embodiment of the present disclosure.

FIG. 8 illustrates a front view of a PV module clip, in accordance with an embodiment of the present disclosure.

DETAILED DESCRIPTION

Figure 1:
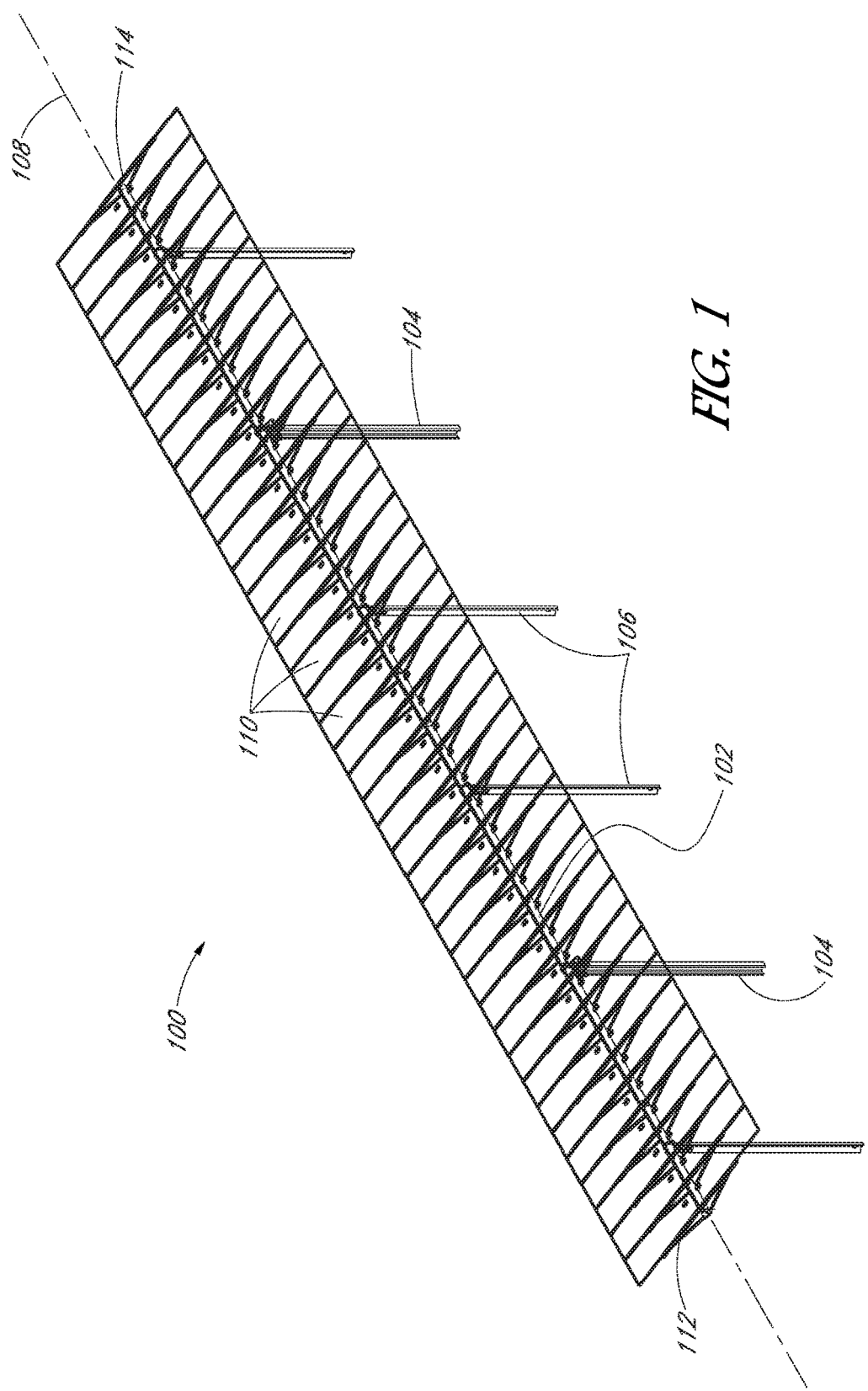
FIG. 1 illustrates a perspective view of a solar-tracking photovoltaic (PV) system, in accordance with an embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" leg does not necessarily imply that this leg is the first leg in a sequence; instead the term "first" is used to differentiate this leg from another leg (e.g., a "second" leg).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Although many of the examples described herein are for solar-tracking photovoltaic (PV) systems, the techniques and structures may apply equally to other non-solar-tracking or stationary solar energy collection systems, as well as concentrated thermal solar systems, etc. Moreover, although much of the disclosure is described in terms of ground-mounted solar-tracking solar collection installations, the disclosed techniques and structures apply equally to other solar energy collection installations, e.g., rooftop solar installations.

The use of conventional fasteners, such as nuts, bolts, or rivets, to attach PV modules to a supportive structure is commonplace today. As PV systems evolve, however, tooling access between PV modules and supportive structures may diminish, and a need to reduce installation costs of the PV systems may grow. Accordingly, a need for a low-cost fastener to attach a PV module to a mounting assembly, which can be installed quickly in compact spaces, has emerged.

In an aspect, a PV module clip includes a toe portion and several legs interconnected by a neck portion. The toe portion may be inserted through several aligned holes of a PV module frame and mounting assembly strut to an underside of the strut. The neck portion may extend upward from the toe portion through the aligned holes to the leg above the PV module frame. The leg may extend around a portion of the frame and strut in a tensioned state, and engage with a retaining feature of the strut to hold the leg in the tensioned state. Accordingly, the toe portion may be biased to fasten the PV module to the mounting assembly. The PV module clip may be formed from a single piece of wire, and may be inserted entirely by hand without the use of tools. Thus, the PV module clip provides a low-cost and efficient solution to an emerging fastener need.

The aspects described above may be realized by the PV module clip and methods disclosed herein. In the following description, numerous specific details are set forth, such as specific material regimes and component structures, in order to provide a thorough understanding of embodiments of the present disclosure. It will be apparent to one skilled in the art that embodiments of the present disclosure may be practiced without these specific details. In other instances, well-known fabrication techniques or component structures, such as specific types of wire-forming techniques are not described in detail in order to not unnecessarily obscure embodiments of the present disclosure. Furthermore, it is to be understood that the various embodiments shown in the figures are illustrative representations and are not necessarily drawn to scale.

By way of summary, disclosed herein is a PV module clip having a toe portion, several legs, and one or more neck portions extending between the toe portion and the legs. In an embodiment, the toe portion has an upper surface extending along a lateral plane, and the neck portion(s) extend upward from the lateral plane to the legs. Accordingly, the toe portion may be inserted through aligned holes in a flange of a PV module and a strut of a mounting assembly supporting the PV module, and the neck portion(s) may extend through the holes to couple the toe portion on an underside of the strut to the legs above the strut. The legs may be configured to bend into a tensioned state to clamp the flange between the legs and the strut. For example, the legs may extend laterally outward from the neck portion(s), over the flange, to a proximal leg junction at a sidewall of the strut. A retaining portion may extend from the proximal leg junction, and may be configured to engage a retaining feature along the sidewall, e.g., a slot, a prong, a bottom edge of the sidewall, etc. Accordingly, the legs may be retained in a bent state, and stored strain energy in the PV module clip may keep the PV module secured against the strut.

Referring to FIG. 1, a perspective view of a solar-tracking PV system is shown in accordance with an embodiment of the present disclosure. An electricity farm may include one or more solar-tracking PV systems 100. Solar-tracking PV system 100 may be considered a multi-drive system because several motor drives may be coupled to a same torque tube 102 to input torque to the torque tube at longitudinally separated locations. In an embodiment, solar-tracking PV system 100 includes several driven support assemblies 104 supporting torque tube 102 above the ground at the longitudinally separated locations. Each driven support assembly 104 may include a drive having a motor, e.g., a stepper motor, and a gear set, e.g., a worm drive, to input torque to torque tube 102 such that torque tube 102 pivots about longitudinal axis 108.

Solar-tracking PV system 100 may also include several non-driven support assemblies 106 supporting torque tube 102 above the ground. For example, a non-driven support assembly 106 may be positioned longitudinally between a pair of driven support assemblies 104. Each non-driven support assembly 106 may support and allow for rotation of torque tube 102 about the longitudinal axis 108 without inputting torque to torque tube 102. Thus, non-driven support assemblies 106 may facilitate a stable rotation of torque tube 102 without actually driving such rotation.

Driven support assemblies 104 may affect rotation of torque tube 102 about longitudinal axis 108 based on electrical inputs provided or controlled by a controller (not shown). The controller may include a microprocessor or computer configured to control the delivery of electrical power to motors of driven support assemblies 104 along torque tube 102. For example, the controller may directly or indirectly, e.g., through control of a power supply, deliver power inputs to driven support assemblies 104. Accordingly, the motors and/or mechanical transmission components of the driven support assemblies 104 may be simultaneously controlled by controller to input torque to the torque tube 102. Thus, torque tube 102 may pivot or rotate about longitudinal axis 108.

Several PV modules 110 may be mounted on torque tube 102 along longitudinal axis 108. For example, solar-tracking PV system 100 may include a row of tens of solar modules arranged in a series. The series may include, for example, 70-100 PV modules 110 between a first outward end 112 and a second outward end 114 of torque tube 102. Thus, the row of PV modules 110 may track a solar source, e.g., the sun or a reflective surface redirecting sunrays toward PV modules 110, when torque tube 102 pivots about longitudinal axis 108.

Figure 2:
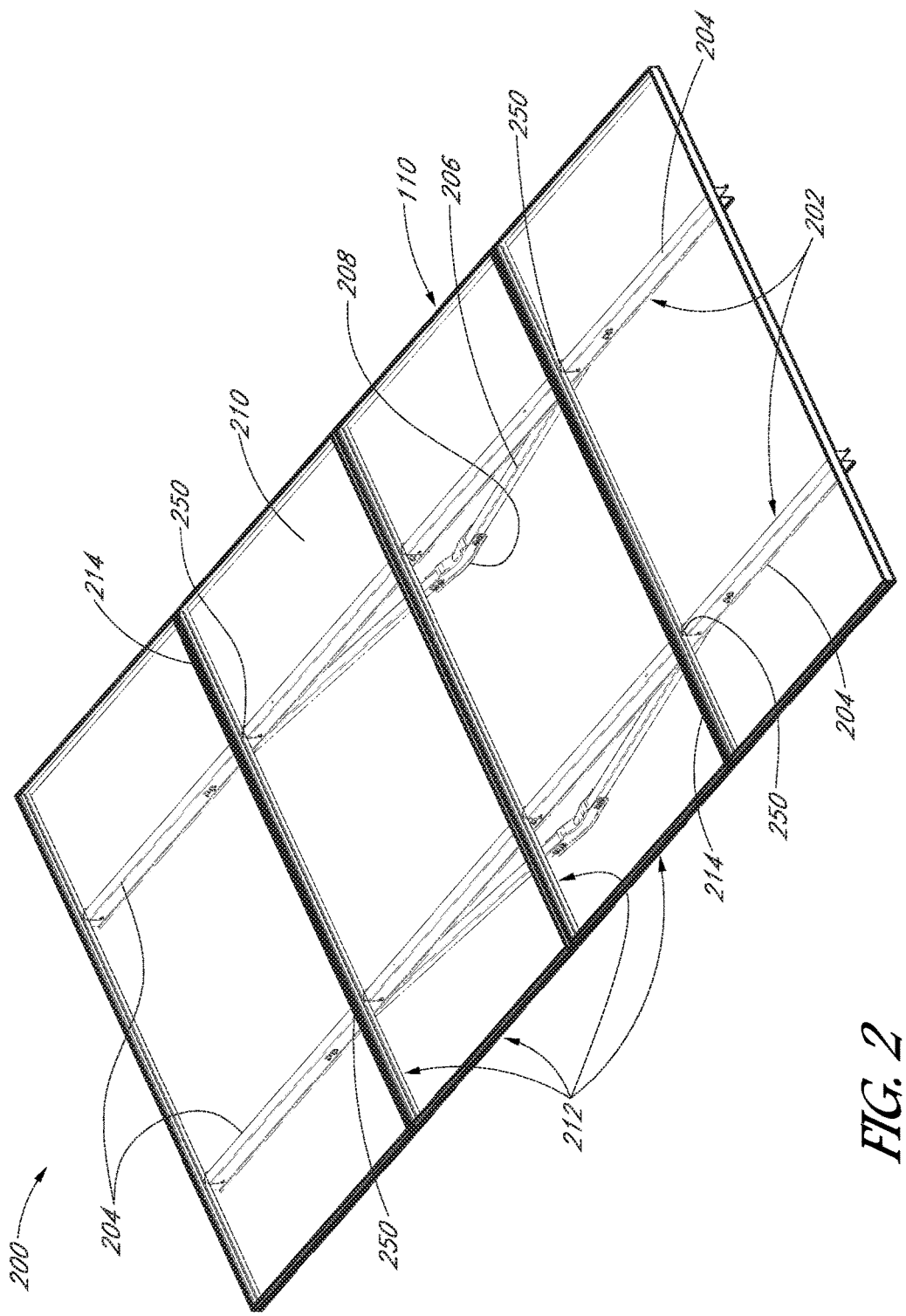
FIG. 2 illustrates a perspective view of a PV module assembly, in accordance with an embodiment of the present disclosure.

Referring to FIG. 2, a perspective view of a PV module assembly is shown in accordance with an embodiment of the present disclosure. A PV module assembly 200 may include PV module 110 mounted on a mounting assembly 202. Mounting assembly 202 may include structural members to attach to torque tube 102 and to provide support to PV module 110. For example, mounting assembly 202 may include one or more strut 204 extending in a lateral direction orthogonal to longitudinal axis 108. Struts 204 may be located over torque tube 102 to suspend PV module 110 above torque tube 102 and support a weight of PV module 110 in the lateral direction. Mounting assembly 202 may also include one or more bottom strut 206 and saddle bracket 208, which may be coupled to strut 204 to form a rigid mounting structure. More particularly, saddle bracket 208 may be located below torque tube 102, and torque tube 102 may be gripped between strut 204 and saddle bracket 208 to secure mounting assembly 202 to torque tube 102 such that mounting assembly 202 pivots in coordination with torque tube 102.

PV module assembly 200 may be a rooftop or fixed tilt mount. That is, PV module assembly, rather than being attached to torque tube 102, may be attached to a rail, bracket, or any other supporting mount that is fixed relative to the ground. In an embodiment, PV module assembly 200 is mounted on a rail fixedly attached to a support surface, e.g., a roof.

It will be appreciated that the mounting structure described above, i.e., the torque tube 102 and mounting assembly 202 of a solar-tracking PV system 100, is provided by way of example, and that mounting assembly 202 may be configured differently. For example, strut 204 of mounting assembly 202 may include a rail, beam, or any other general mounting structure that is fixed to a stationary platform, e.g., a rooftop or the ground. Thus, a PV module clip may be used to fasten structural components in both fixed tilt and tracker applications. Accordingly, the PV module clip described herein may be used to fasten a wide variety of structures, including structures that are portions of assemblies other than solar-tracking PV systems 100.

An orientation of PV module 110 may be considered a portrait orientation or a landscape orientation. The portrait orientation and the landscape orientation may be defined based on a relationship of a long edge of PV module 110 relative to torque tube 102, or to a north-south direction. Torque tube 102 may ordinarily be oriented such that longitudinal axis 108 extends in the north-south direction, allowing PV modules to rotate from east to west about longitudinal axis 108 to track the solar source. PV module may have a rectangular profile, having a long edge and a short edge. In an embodiment, a portrait orientation of PV module 110 refers to an orientation of PV module 110 having the long edge perpendicular to torque tube 102 and/or longitudinal axis 108 (FIG. 1). The landscape orientation, by contrast, may be an orientation of PV module 110 having the short edge perpendicular to torque tube 102 and the long edge parallel to torque tube 102 (FIG. 2). Accordingly, it will be appreciated that PV module 110 may be oriented in numerous manners relative to torque tube 102 within the scope of this description.

Each PV module 110 may include a PV laminate 210 mounted on a PV frame 212. PV laminate 210 may include one or more solar collecting devices, e.g., PV cells, and the PV laminate 210 and PV cells may be configured to receive sunlight for conversion into electrical energy. For example, the PV cells may be laminated between an optically transparent upper cover and a back cover. By way of example, the PV cells may be encapsulated by an encapsulant material between a glass top plate and a back sheet. The back sheet may be optically transparent, e.g., formed from glass, or opaque. Thus, sunlight may transmit through one or more of the top plate or back sheet to the PV cells for conversion into electricity.

Each PV frame 212 may support a respective PV laminate 210 along an outer perimeter and/or a back surface of the laminate structure. For example, PV frame 212 may include one or more cross members 214 supporting the back surface of PV laminate 210. PV frame 212 may be mounted on mounting assembly 202, as described below. Accordingly, a front surface of PV laminate 210 may face a direction orthogonal to torque tube 102 to capture impinging sunlight as torque tube 102 pivots about longitudinal axis 108.

Figure 3:
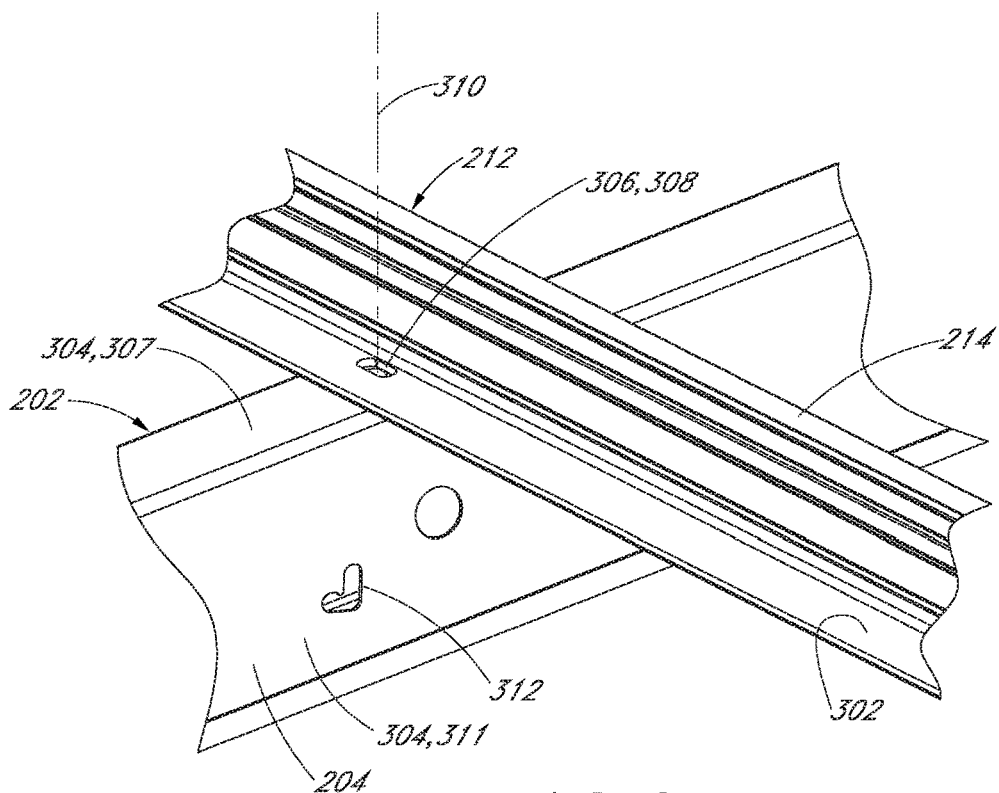
FIG. 3 illustrates a perspective view of a PV frame mounted on a mounting assembly, in accordance with an embodiment of the present disclosure.

Referring to FIG. 3, a perspective view of a PV frame mounted on a mounting assembly is shown in accordance with an embodiment of the present disclosure. PV frame 212 is illustrated without PV laminate 210 to avoid obscuring the relevant features of the illustration, however, it will be understood that PV laminate 210 may be supported by PV frame 212 when PV frame 212 is placed onto mounting assembly 202. In an embodiment, PV frame 212 includes a frame flange 302 projecting outward from cross member 214. Frame flange 302 may have a thin-walled structure. Similarly, strut 204 of mounting assembly 202 may include a mounting wall 304 having a thin-walled structure. For example, strut 204 may have a tubular, an inverted U-shaped, or another cross-sectional profile formed by a mounting wall 304 extending around an axis passing lengthwise through strut 204.

Frame flange 302 may be mounted on mounting wall 304. For example, mounting wall 304 may include an upper surface 307, and frame flange 302 may be mounted on upper surface 307 such that upper surface 307 is apposed to a lower face of frame flange 302. In an embodiment, a flange toe opening 306 extends through frame flange 302. Similarly, a strut toe opening 308 may extend through mounting wall 304, e.g., through upper surface 307 of mounting wall 304. The openings in the strut 204 and/or PV frame 212 may be holes having a variety of geometries. For example, the openings may be circular holes or non-circular slots. Essentially, the openings are voids extending through the wall structures from a first side to a second side to allow a portion of a PV module clip to pass through, as described below.

As described below, strut toe opening 308 may be used as a feature to receive and retain a toe portion of a PV module clip. Thus, it will be appreciated that similar features may be provided on mounting wall 304 other than strut toe opening 308. For example, PV module assembly 200 may include flange toe opening 306 to receive the PV module clip through frame flange 302, however, there may be no hole through mounting wall 304. In an embodiment, the PV module clip portion that passes through flange toe opening 306 may be retained below frame flange 302 by a hook, a prong, a seat, or another securement feature extending from mounting wall 304, or another portion of strut 204. One skilled in the art would contemplate that such securement features may engage the PV module clip to resist retraction of the PV module clip from the flange toe opening 306. Thus, the PV module clip may be fixed relative to strut 204 to hold frame flange 302 in place, as described in the embodiments below.

Frame flange 302 may be mounted on upper surface 307 such that strut toe opening 308 and flange toe opening 306 are aligned along an axis 310. For example, axis 310 may be a vertical axis 310 extending orthogonal to the lengthwise axis extending along strut 204 and longitudinal axis 108 extending along torque tube 102. Accordingly, axis 310 may be perpendicular to upper surface 307 of mounting wall 304 and/or parallel to a sidewall 311 of strut 204.

Sidewall 311 of strut 204 may extend downward from upper surface 307. For example, mounting wall 304 may have a cross-sectional profile extending along an inverted U-shaped path, and sidewall 311 may form a vertical section of the inverted U. accordingly, sidewall 311 may include an outward surface orthogonal to upper surface 307. In an embodiment, a retaining opening 312 extends through sidewall 311. Retaining opening 312 in strut 204 may be a hole having a variety of geometries. For example, retaining opening 312 may be a circular hole or a non-circular slot. Retaining opening 312 may include an L-shaped slot, as described below. Essentially, retaining opening 312 is a void extending through mounting wall 304 from the outward surface to an inward surface to allow a portion of a PV module clip to pass through, as described below.

Figure 4:
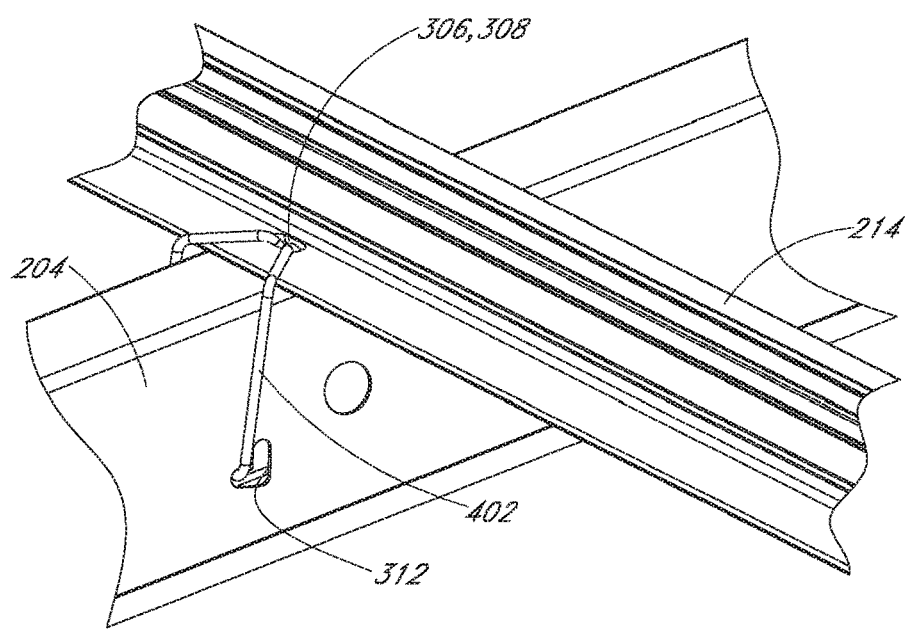
FIG. 4 illustrates a perspective view of a PV module clip fastening a PV frame to a mounting assembly, in accordance with an embodiment of the present disclosure.

Referring to FIG. 4, a perspective view of a PV module clip fastening a PV frame to a mounting assembly is shown in accordance with an embodiment of the present disclosure. When cross member 214 is mounted on strut 204 such that strut toe opening 308 and flange toe opening 306 are aligned along axis 310, a PV module clip 402 may engage the structural members at strut toe opening 308, flange toe opening 306, and retaining opening 312, to fasten PV frame 212 to mounting assembly 202. PV module clip 402 may be formed from a single length of wire, e.g., a spring steel or stainless steel wire, having various portions to perform functions as described below. The length of wire forming PV module clip 402 may include an electrically conductive material, and thus, when PV module clip 402 fastens PV frame 212 to mounting assembly 202, the length of wire may provide a grounding path between PV frame 212 and mounting assembly 202. As described below, PV module clip 402 may include grounding teeth, pierce points, roughened surface regions, or other features to break through aluminum anodization or oxidation to establish an electrical connection to PV frame 212 and/or mounting assembly 202.

Referring to FIG. 5, a section view of a PV module clip fastening a PV frame to a strut is shown in accordance with an embodiment of the present disclosure. When PV module clip 402 is installed to fasten PV frame 212 to mounting assembly 202, a wire body of PV module clip 402 may extend from a distal tip 502 below mounting wall 304 to a clip end 504 retained in a deflected position by strut 204. As clarified below, when clip end 504 is in the deflected position, PV module clip 402 is in a tensioned state. More particularly, PV module clip 402 may be bent from a free state to the tensioned state such that clip end 504 may be passed through retention opening 312 in strut 204. For example, retention opening 312 may include an L-shaped slot 506 having an insertion slot 508, which clip end 504 may be inserted through, and a retention slot 510, which PV module clip 402 may press against to hold PV module clip 402 in the tensioned state having clip end 504 at the deflected position.

In the tensioned state, PV module clip 402 may extend between distal tip 502 and clip end 504 through flange toe opening 306 in frame flange 302 and strut toe opening 308 in mounting wall 304. More particularly, PV module clip 402 may extend from distal tip 502 below mounting wall 304, upward through the openings in mounting wall 304 and frame flange 302, around a top surface of frame flange 302, and downward toward retention opening 312 in sidewall 311. Thus, frame flange 302 may be sandwiched between a portion of PV module clip 402 extending over and around frame flange 302, and mounting wall 304, which extends along a lateral plane 512 orthogonal to axis 310. Having now established some of the basic structural features and functions of PV module clip 402, further description of the individual clip portions is now described. The overall form and function of a PV module assembly 200 having PV module clip 402 is revisited below with respect to FIGS. 10A-12.

Referring to FIG. 6, a perspective view of a PV module clip is shown in accordance with an embodiment of the present disclosure. PV module clip 402 may include a toe portion 602 extending between distal tip 502 and one or more toe junctions 604. Toe portion 602 may be a section of a length of wire extending along a U-shaped path between a first toe junction 604 and a second toe junction 604, as shown. Alternatively, toe portion 602 may include a different structure extending distally from a single toe junction 604 to distal tip 502. For example, toe portion 602 may include a flat, plate-like tab having a distal edge at distal tip 502 and a proximal edge at toe junction 604.

Regardless of a particular form of toe portion 602, toe portion 602 may include an upper toe surface 606 extending between toe junction 604 and distal tip 502. More particularly, upper toe surface 606 may extend along lateral plane 512 between distal tip 502 and toe junctions 604. Here, the term lateral plane is used to indicate that upper toe surface 606 may extend along a plane that, when PV module clip 402 is installed to fasten PV module 110 to mounting assembly 202, may be parallel to lateral plane 512 along which mounting wall 304 extends (FIG. 5). More particularly, upper toe surface 606 may extend along a plane such that upper toe surface 606 presses against an underside of mounting wall 304 when PV module clip 402 is installed. Accordingly, toe portion 602 may grip mounting wall 304 of mounting assembly 202 in a PV module assembly 200.

PV module clip 402 may include several legs 608 coupled to toe portion 602 by one or more neck portion 610. More particularly, each neck portion 610 may extend upward from one or more toe junctions 604 to a distal leg junction 612 of a respective leg 608. Here, the term junction is used to denote a location at which conceptual portions of PV module clip 402, as described herein, are joined together. Such junctions, however, may not be discrete structures. More particularly, a length of wire forming PV module clip 402 may extend continuously between clip ends 504. That is, the length of wire may extend through legs 608, neck portions 610, toe portion 602, and retaining portions 616, and those portions may constitute segments of the length of wire. Accordingly, the described junctions may be locations along the continuous length of wire. On the other hand, the junctions may be discrete. For example, leg 608 may be formed from a bent length of wire, and neck portion 610 and toe portion 602 may be formed from a bent or cast sheet metal. Accordingly, the bent wire and bent sheet metal may be joined by a spot weld, and the spot weld may provide a distal leg junction 612. By the same token, PV module clip 402 may be formed from a single length of wire, and junctions may be representative of regions of high stress when PV module clip 402 is bent toward the tensioned state. For example, when legs 608 are bent downward toward retention opening 312 in strut 204, as described below, regions of higher material stress may develop at a distal leg junction 612. Thus, the location of junctions may be related to a non-discrete joint between functionally different regions, a discrete joint between separate structures, or a region having material characteristics that differ from surrounding regions.

Each leg 608 may extend from a respective distal leg junction 612 to a proximal leg junction 614. More particularly, each leg 608 may join a respective retaining portion 616 at proximal leg junction 614. As described below, legs 608 of PV module clip 402 provide a spring force in the tensioned state to hold frame flange 302 against mounting wall 304. Retaining portions 616, on the other hand, function to interface with strut 204, e.g., by inserting into retaining opening 312, to hold legs 608 in the tensioned state.

Referring to FIG. 7, a side view of a PV module clip is shown in accordance with an embodiment of the present disclosure. A structural configuration of leg 608 when PV module clip 402 is in a free state 702, i.e., when PV module clip 402 is not installed in PV module assembly 200, is represented by a dotted line. By contrast, the solid line representation of PV module clip 402 illustrates leg 608 in a bent configuration when PV module clip 402 is in the tensioned state, i.e., when PV module clip 402 is installed in PV module assembly 200. It is apparent that, in the tensioned state, substantial spring force may be generated through elastic material strain at distal leg junction 612. More particularly, PV module clip 402 may have a tendency to resiliently recover from the tensioned state to free state 702, and thus, PV module clip 402 provides a reactive force to surfaces that resist that recovery, i.e., to surfaces that retain PV module clip 402 in the tensioned state.

In an embodiment, upper toe surface 606 defines lateral plane 512 along which toe portion 602 presses against an underside of mounting wall 304 when PV module clip 402 is installed. That is, upper toe surface 606 extends along lateral plane 512 below mounting wall 304. Similarly, proximal leg junction 614 of each leg 608 may be below lateral plane 512. For example, proximal leg junction 614 may be below lateral plane 512 in both free state 702 and the tensioned state. Accordingly, each leg 608 may extend downward from a knee portion 704 to proximal leg junction 614. As such, spring tension stored in PV module clip 402 will force upper toe surface 606 upward against mounting wall 304 when proximal leg junction 614 is held in place, e.g., when retaining portion 616 is fixed within retaining opening 312.

Leg 608 may extend from distal leg junction 612 to knee portion 704 of leg 608. Leg 608 may extend parallel to lateral plane 512 between knee portion 704 and distal leg junction 612 in one or more of free state 702 or the tensioned state. For example, as shown, the portion of leg 608 between knee portion 704 and distal leg junction 612 may extend parallel to lateral plane 512 in the tensioned state, and may extend obliquely to lateral plane 512 in free state 702. Alternatively, the portion of leg 608 between knee portion 704 and distal leg junction 612 may extend parallel to lateral plane 512 in both the tensioned state and free state 702. In the latter case, leg 608 may be configured to generate substantial material strain at knee portion 704 instead of, or in addition to, material strain generated at distal leg junction 612. In either case, the portion of leg 608 between distal leg junction 612 and knee portion 704 may extend parallel to lateral plane 512 in the tensioned state to extend over and around frame flange 302 sandwiched between the lateral portion of leg 608 and mounting wall 304.

The term parallel as used here and throughout this description is intended to encompass a substantially parallel relationship between structures. For example, leg 608 may be considered to be parallel to a surface even when an angle is present between an axis extending through leg 608 and the surface, e.g., an angle of several degrees. Thus, it will be appreciated that structures described as being parallel may also be described as having surfaces facing each other and/or planes or axes defining the structures that are orthogonal to a same line extending between the planes or axes.

Referring to FIG. 8, a front view of a PV module clip is shown in accordance with an embodiment of the present disclosure. A vertical plane 801 may be referentially defined as a plane extending through distal tip 502 orthogonal to lateral plane 512. In an embodiment, legs 608 may extend from distal leg junctions 612 on opposite sides of vertical plane 801 to respective knee portions 704. For example, legs 608 may extend above lateral plane 512 and laterally outward from respective distal leg junctions 612 to knee portions 704. Furthermore, each leg 608 may extend parallel to vertical plane 801, downward to proximal leg junction 614. Thus, proximal leg junction 614 may be laterally outward from distal leg junction 612 relative to vertical plane 801.

PV module clip 402 may include several retaining portions 616. That is, each leg 608 may be coupled to a respective retaining portion 616 at proximal leg junction 614. In an embodiment, retaining portion 616 extends laterally inward from a respective proximal leg junction 614 toward vertical plane 801. For example, retaining portion 616 may include a hook-shaped portion 802 extending from proximal leg junction 614 to clip end 504. Clip end 504 may be nearer to vertical plane 801 than proximal leg junction 614, i.e., laterally inward from proximal leg junction 614. Furthermore, in an embodiment, clip end 504 may be vertically above proximal leg junction 614. Accordingly, hook-shaped portion 802 may include a bend 804 having a U-shaped profile between proximal leg junction 614 and a proximal bend terminal 806. Furthermore, bend 804 may include a bend surface 808 along an inner radius of hook-shaped portion 802.

Figure 9:
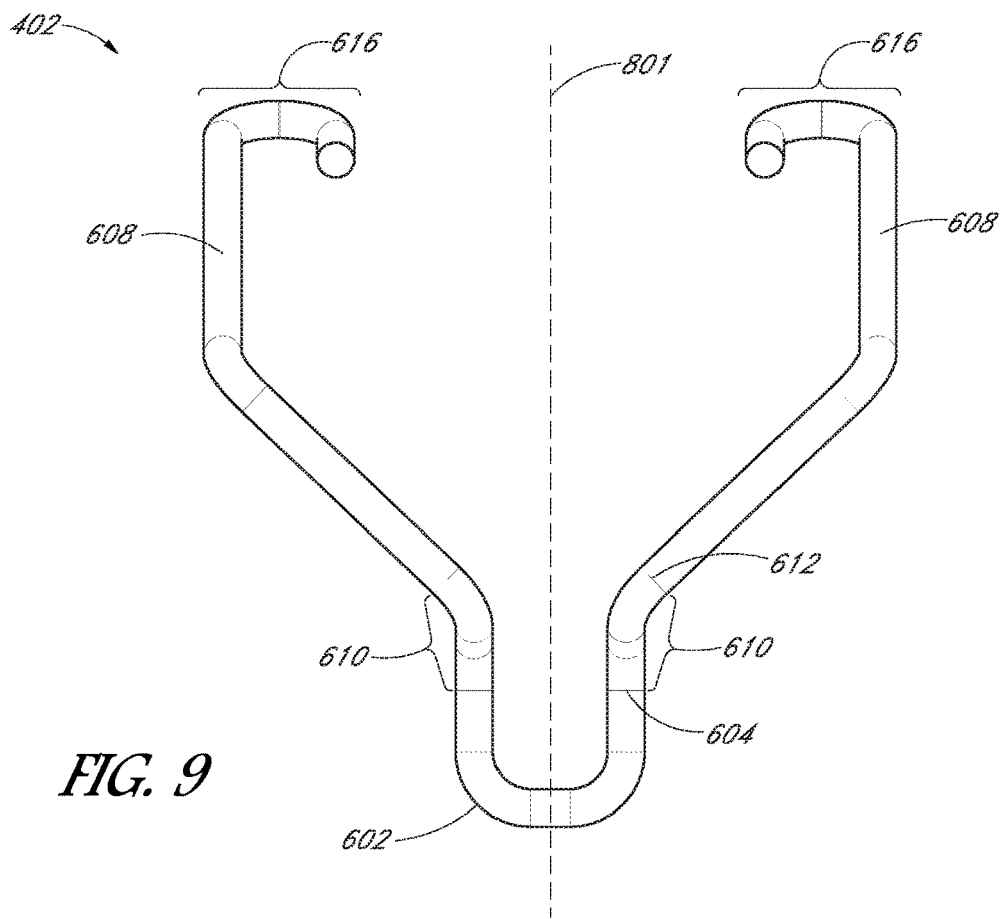
FIG. 9 illustrates a top view of a PV module clip, in accordance with an embodiment of the present disclosure.

Referring to FIG. 9, a top view of a PV module clip is shown in accordance with an embodiment of the present disclosure. Vertical plane 801 may be a plane of symmetry of PV module clip 402. More particularly, the portions of PV module clip 402 may be symmetrical about vertical plane 801. For example, vertical plane 801 extending through distal tip 502 may bisect the structure of PV module clip 402 such that one or more of toe portion 602, neck portions 610, legs 608, or retaining portions 616 are symmetrical about vertical plane 801. Other points of reference of PV module clip 402 may be identified in FIG. 9 by comparison to the description of FIGS. 6-8 above. Thus, geometric relationships between points of reference may be identified in relation to vertical plane 801 and lateral plane 512 (viewed from above in FIG. 9) without belaboring the description. For example, one skilled in the art would identify that, in an embodiment, toe junction 604 is distal to and laterally inward from distal leg junction 612.

Figure 10A:
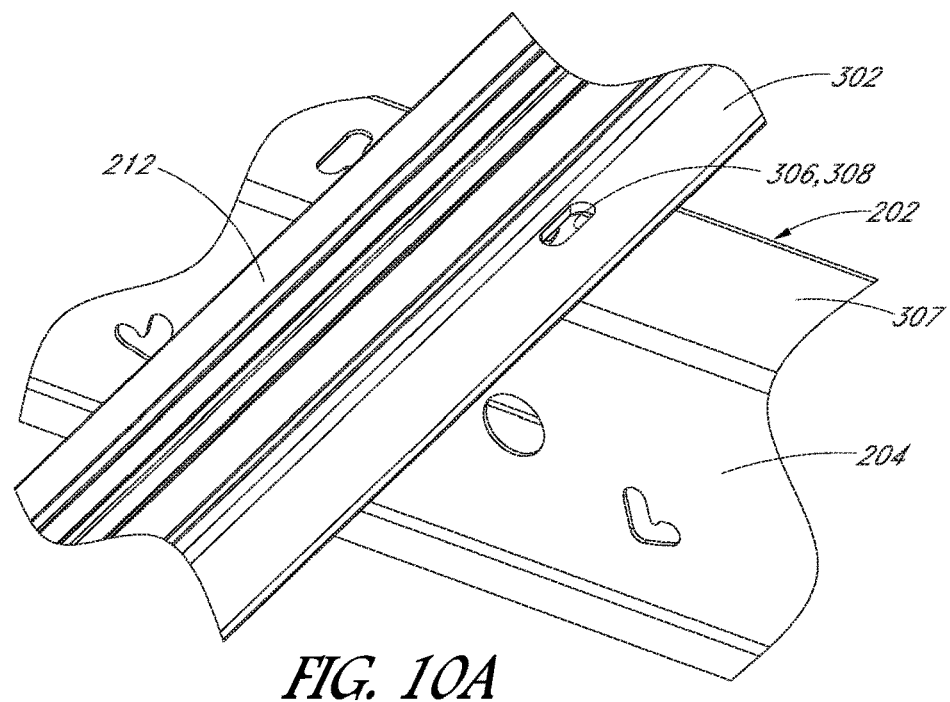
FIGS. 10A-10C illustrate various operations of a method of fastening a PV module to a mounting assembly using a PV module clip, in accordance with an embodiment of the present disclosure.
Figure 10B:
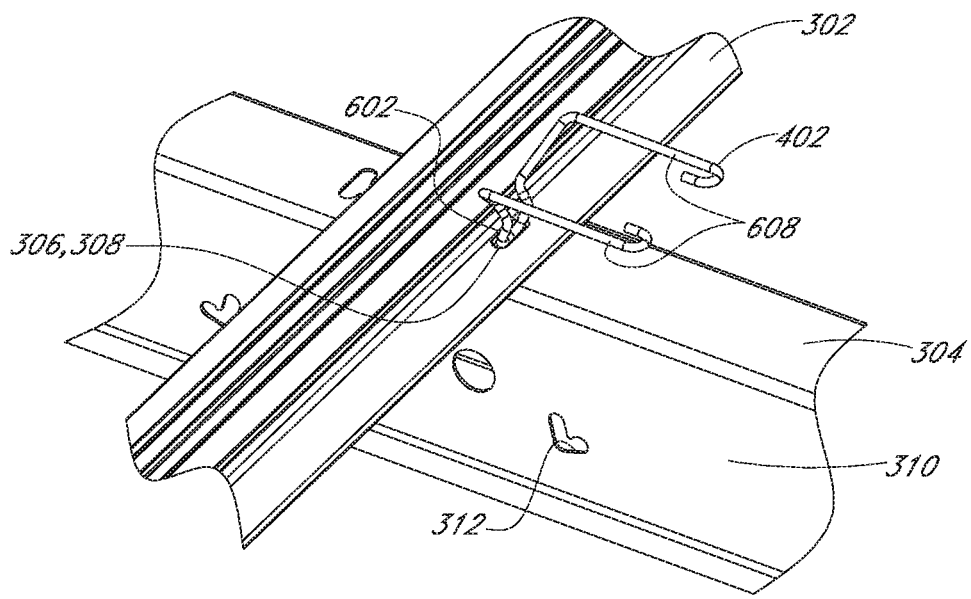
Figure 10C:
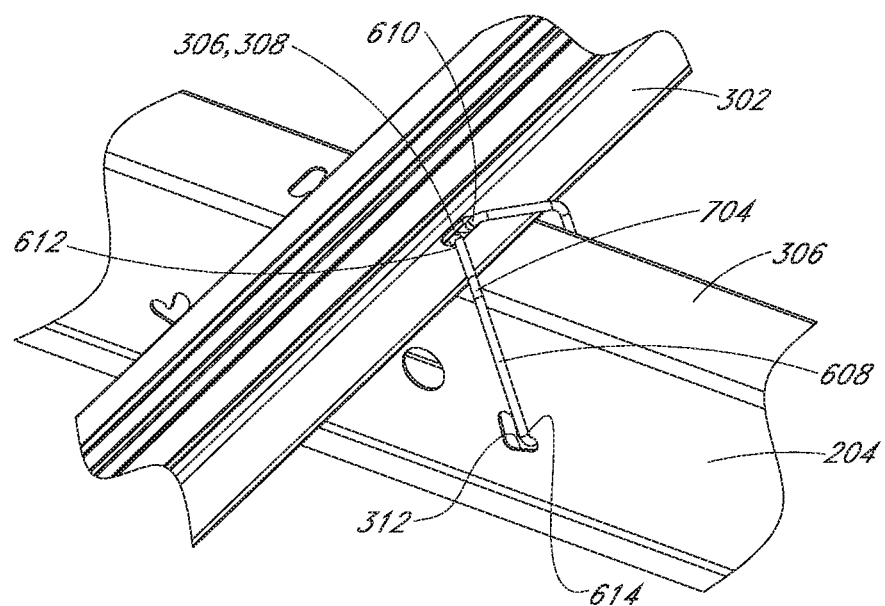

Referring to FIGS. 10A-10C, a method of fastening a PV module to a mounting assembly using a PV module clip is shown in accordance with an embodiment of the present disclosure. With respect to FIG. 10A, PV frame 212 may be mounted on mounting assembly 202 as described above. More particularly, frame flange 302 may be placed on strut 204 such that an underside of frame flange 302 is apposed to upper surface. Furthermore, flange toe opening 306 may be aligned with strut toe opening 308 along axis 310.

Referring to FIG. 10B, PV module clip 402 may be inserted through PV frame 212 and mounting assembly 202 in free state 702. More particularly, toe portion 602 may be inserted into the aligned flange toe opening 306 and strut toe opening 308 such that distal tip 502 passes from above frame flange 302 to below mounting wall 304. Again, the insertion of toe portion 602 may be performed while PV laminate 210 is installed within PV frame 212. Accordingly, PV module clip 402 may be installed quickly, without tools, and within a compact access space.

When toe portion 602 is inserted through the aligned openings of frame flange 302 and upper surface 307, it can be seen that upper toe surface 606 extends along a plane generally orthogonal to upper surface. Thus, it may be recognized that upper toe surface 606 extends along a plane generally orthogonal to lateral plane 512 along which mounting wall 304 extends (FIG. 5.). Accordingly, to engage mounting wall 304 with toe portion 602, PV module clip 402 may be swung about an edge of mounting wall 304 around strut toe opening 308 until upper toe surface 606 is apposed to an underside of mounting wall 304 along lateral plane 512.

As PV module clip 402 is rotated to bring legs 608 downward alongside sidewall 311, legs 608 may be laterally outward to straddle strut 204. More particularly, a distance between clip ends 504 may be increased by flexing legs 608 apart from each other so that strut 204 fits between clip ends 504. Clip ends 504 may be rotated toward retaining opening 312. Thus, in the tensioned state, spring tension may be developed in PV module clip 402 such that legs 608 have a tendency to rotate upward to free state 702 in which toe portion 602 was inserted into the aligned openings, and the legs 608 have a tendency to move laterally inward toward vertical plane 801. Alternatively, the distance between clip ends 504 in the free state may be wider than strut 204 so that clip legs 608 can straddle strut 204 without flexing legs 608 apart from each other. In this example, as the clip ends 504 are rotated toward retaining opening 312, the legs are pushed into the insertion slot 508, and when clip is relaxed and travels along retention slot 510, clip ends 504 are retained from springing outward by sidewall 311.

Referring to FIG. 10C, when toe portion 602 is inserted fully through the aligned openings, neck portion 610 may extend from toe portion 602 through strut toe opening 308 and flange toe opening 306. Accordingly, legs 608 may extend over frame flange 302 and around upper surface 307 of strut 204 to sidewall 311. More particularly, each leg 608 may extend laterally outward from distal leg junction 612 to proximal leg junction 614 at sidewall 311. Again, the configuration of PV module clip 402 shown in FIG. 10C may be in the tensioned state after one or more portions of legs 608 have been manually flexed to elastically deform legs 608 to a spring-loaded position, i.e., to a position in which strain energy is stored in PV module clip 402. The more that legs 608 are bent, the higher the strain energy may be, and the tighter PV module clip 402 may hold frame flange 302 against mounting wall 304.

In the tensioned state (and optionally in free state 702) each leg 608 may extend parallel to upper surface of strut 204 from distal leg junction 612 to knee portion 704. Accordingly, frame flange 302 may be trapped between upper surface 307 of strut 204 and the portion of leg 608 between distal leg junction 612 and knee portion 704. Knee portion 704 may follow an angulation between upper surface 307 and sidewall 311. For example, upper surface 307 and sidewall 311 of strut 204 may meet at an edge, and knee portion 704 may conform to an angle of the edge. In an embodiment, leg 608 may extend parallel to sidewall 311 from knee portion 704 to proximal leg junction 614. More particularly, when sidewall 311 is oriented vertically, leg 608 may extend vertically downward from knee portion 704 to proximal leg junction 614.

In an embodiment, leg 608 does not extend along a vertical plane downward from knee portion 704 to proximal leg junction 614. For example, the portion of leg 608 extending between knee portion 704 and proximal leg junction 614, as shown in FIGS. 8-9, extend along a vertical plane, however, that portion may bow outward in another embodiment. That is, the portion of leg 608 may slant or extend laterally from knee portion 704 to proximal leg junction 614 such that proximal leg junction 614 is farther from vertical plane 801 than knee portion 704. In an embodiment, the slant of the portion relative to vertical plane 801 may be in a range of 5-20 degrees, e.g., 10 degrees. Thus, the leg portion may be bent inward to engage insertion slot 508, which retains the leg portion in the inwardly bent orientation, as described above.

Proximal leg junction 614 may be positioned next to retaining opening 312 in sidewall 311. More particularly, proximal leg junction 614 may be located on an outward side of sidewall 311 adjacent to retaining opening 312. Accordingly, retaining portion 616 may extend laterally inward from proximal leg junction 614 through retaining opening 312. Thus, leg 608 may be on an opposite side of sidewall 311 from vertical plane 801 extending through distal tip 502, and clip end 504 may be between sidewall 311 and vertical plane 801 containing axis 310 extending through the aligned openings.

As described above, retaining opening 312 in sidewall 311 may have a particular geometry suited to receive retaining portion 616 of PV module clip 402 and to retain retaining portion 616 of PV module clip 402 in the tensioned state. For example, referring again to FIG. 5, L-shaped slot 506 may include insertion slot 508 oriented in a direction that aligns with retaining portion 616 when leg 608 is flexed into the tensioned state. Accordingly, hook-shaped portion 802 of retaining portion 616 may be inserted laterally inward through insertion slot 508. Whereas insertion slot 508 may have a profile matching that of retaining portion 616 extending between bend 804 and clip end 504, retention slot 510 may extend in a direction orthogonal to the direction of insertion slot 508 such that legs 608 may be relaxed slightly from the fully flexed position to allow bend 804 to slide into retention slot 510, and to permit bend 804 to engage an edge of strut 204 surrounding retaining opening 312 such that leg 608 is held in the tensioned state by strut 204. It will be appreciated that, when clip end 504 is vertically above bend 804 and bend 804 is placed within retention slot 510 having a slot width less than a distance between bend 804 and clip end 504, clip end 504 is laterally inward from sidewall 311 and prevents leg 608 and retaining portion 616 from being pulled outward or dislodged from strut 204. As such, the interaction between retaining portion 616 of PV module clip 402 and retaining opening 312 of strut 204 ensures that PV module clip 402 will remain in the tensioned state to fasten PV module 110 to mounting assembly 202.

Figure 11:
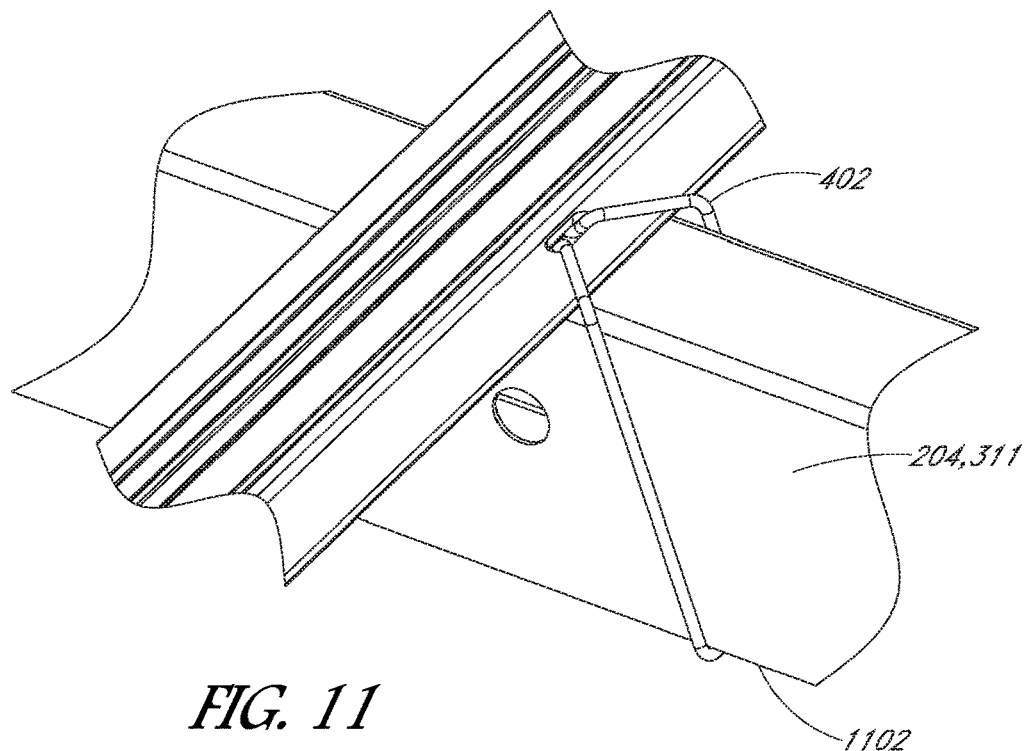
FIG. 11 illustrates a perspective view of a PV module clip retained by an edge of a mounting assembly, in accordance with an embodiment of the present disclosure.

Referring to FIG. 11, a perspective view of a PV module clip retained by an edge of a mounting assembly is shown in accordance with an embodiment of the present disclosure. Retaining portion 616 of PV module clip 402 may be retained by other features of strut 204. For example, sidewall 311 of strut 204 may include a bottom edge 1102, e.g., an end of one of the vertical sides of an inverted U-shaped profile. When PV module clip 402 is loaded into the PV module assembly 200, retaining portions 616 may be bent downward beyond bottom edge 1102 and then inward such that clip ends 504 pass below bottom edge 1102 from a position laterally outward of sidewall 311 to a position laterally inward of sidewall 311. Legs 608 may then be relaxed somewhat to the tensioned state, in which bend surface 808 of bend 804 is retained at bottom edge 1102 of sidewall 311.

Figure 12:
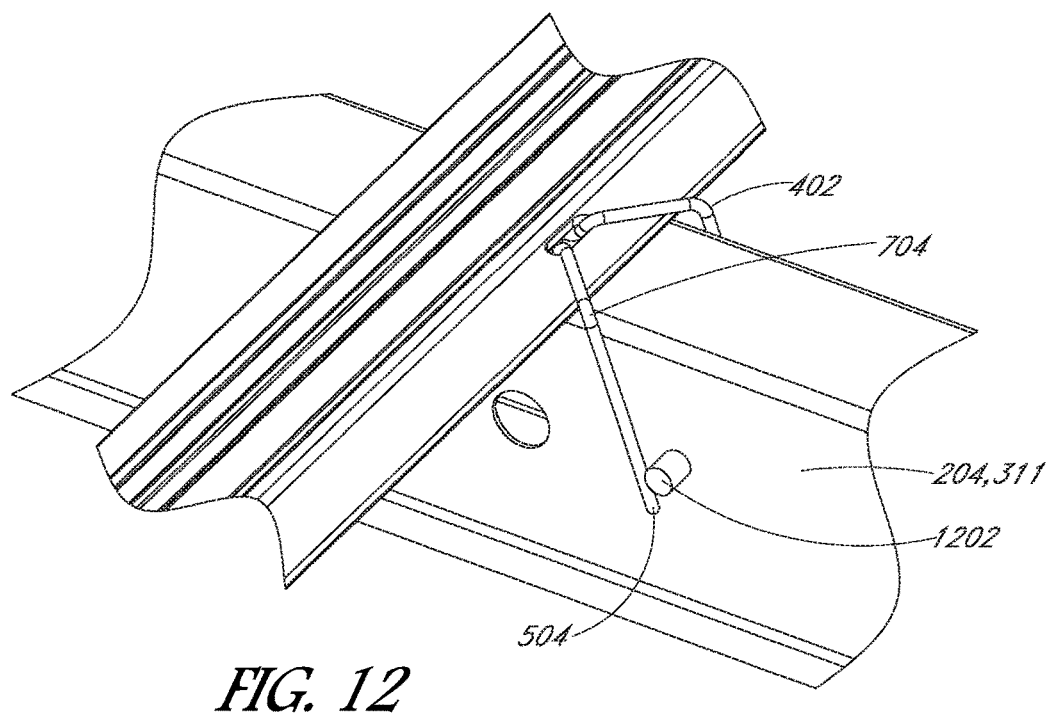
FIG. 12 illustrates a perspective view of a PV module clip retained by a retention prong of a mounting assembly, in accordance with an embodiment of the present disclosure.

Referring to FIG. 12, a perspective view of a PV module clip retained by a retention prong of a mounting assembly is shown in accordance with an embodiment of the present disclosure. In an embodiment, strut 204 may lack a retaining opening 312, and instead, a retention prong 1202 may extend laterally outward from sidewall 311. Retention prong 1202 may be a cylindrical boss feature, or may have a more complex geometry, e.g., a hook-shaped tab. In any case, retaining portion 616 of PV module clip 402 may be omitted. That is, leg 608 may extend downward from knee portion 704 to clip end 504 at a location that was previously described as proximal leg junction 614. Accordingly, when PV module clip 402 is loaded into the PV module assembly 200, leg 608 may be bent downward beyond retention prong 1202 and then inward such that leg 608 presses against sidewall 311. Legs 608 may then be relaxed somewhat to the tensioned state, in which leg 608 is retained against a side surface of retention prong 1202.

In an embodiment, PV module clip 402 may provide an electrical grounding path between PV module 110 and mounting assembly 202. PV frame 212 and strut 204 may be formed from a metal such as aluminum or steel, and thus, when toe portion 602 presses against an underside of mounting wall 304 and neck portion 610 or leg 608 press against frame flange 302 electrical current may transmit from frame flange 302 to mounting wall 304 through PV module clip 402. A ground path may also be established when neck portion 610 presses against inside walls of strut opening 308 or flange opening 306. For example, PV module assembly 200 may incorporate an interference fit design such that the openings are sized to interfere with neck portion 610 when PV module clip 402 is inserted, and thus, physical and electrical contact between the interior walls surrounding the openings, and neck portion 610 may be made. To facilitate electrical grounding, PV module clip 402 may include features to electrically connect to corresponding surfaces of PV frame 212 or mounting assembly 202. For example, an upper surface of toe portion 602 and/or surfaces of neck portions 610 of PV module clip 402 may be roughened, or may include relatively sharp projections, teeth, or pierce points (as compared to a surrounding area of PV module clip 402) to breach an oxide layer of the corresponding surfaces of PV frame 212 or mounting assembly 202. In an embodiment, the spring energy developed in PV module clip 402 during installation is sufficient to press the electrical grounding features of PV module clip 402 through the oxide layer of the aluminum frame to establish an electrical ground.

The relative location between PV module clips 402 and PV laminate 210 may be predetermined. For example, referring again to FIG. 2, PV laminate 210 may include quarter points 250 evenly and symmetrically distributed across a laminate surface. More particularly, when crossing reference lines are drawn across the laminate surface between corners of PV laminate 210, quarter points 250 may be at the four locations on the crossing reference lines that are equidistant between a corner and a center of the PV laminate 210 along the crossing reference lines. Establishing stable supports at quarter points 250 may contribute toward stability of PV laminate 210 because load induced stresses can be evenly distributed to mounting assembly 202 at those locations. Thus, PV module clip 402 may fasten PV frame 212 to mounting assembly 202 at quarter points 250 of PV laminate 210.

PV module clips, and methods of fastening a PV module to a structural member using PV module clips, have been described. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A photovoltaic (PV) module assembly, comprising:
   a mounting assembly having a strut, wherein the strut includes a mounting wall having an upper surface, and a sidewall, and wherein a strut toe opening extends through the mounting wall;
   a PV module having a PV laminate mounted on a PV frame, wherein the PV frame includes a frame flange mounted on the upper surface of the strut, wherein a flange toe opening extends through the frame flange, and wherein the strut toe opening and the flange toe opening are aligned along an axis; and
   a PV module clip including
      a toe portion having an upper toe surface extending along a lateral plane below the mounting wall,
      one or more neck portions extending from the toe portion through the strut toe opening and the flange toe opening, and
      a plurality of legs, wherein each leg is coupled to a respective neck portion at a distal leg junction, and wherein each leg extends laterally outward from the distal leg junction to a proximal leg junction at the sidewall.

2. The PV module assembly of claim 1, wherein each leg extends parallel to the upper surface of the strut from the distal leg junction to a knee portion, and wherein each leg extends parallel to the sidewall from the knee portion to the proximal leg junction.

3. The PV module assembly of claim 1, wherein the PV module clip further includes a plurality of retaining portions, wherein each retaining portion includes a hook-shaped portion extending from the proximal leg junction to a clip end between the sidewall and a vertical plane containing the axis.

4. The PV module assembly of claim 3, wherein the strut further includes a retaining opening extending through the sidewall, and wherein one of the retaining portions extends laterally inward from a respective one of the proximal leg junctions through the retaining opening.

5. The PV module assembly of claim 4, wherein the retaining opening includes an L-shaped slot.

6. The PV module assembly of claim 3, wherein the hook-shaped portion includes a bend surface, wherein the sidewall includes a bottom edge, and wherein the bend surface is retained at the bottom edge of the sidewall.

7. A solar-tracking photovoltaic (PV) system, comprising:
   a torque tube extending along a longitudinal axis and pivotable about the longitudinal axis;
   a mounting assembly having a strut, wherein the strut includes a mounting wall having an upper surface, and a sidewall, and wherein a strut toe opening extends through the mounting wall;
   a PV module having a PV laminate mounted on a PV frame, wherein the PV frame includes a frame flange mounted on the upper surface of the strut, wherein a flange toe opening extends through the frame flange, and wherein the strut toe opening and the flange toe opening are aligned along an axis; and
   a PV module clip including
      a toe portion having an upper toe surface extending along a lateral plane below the mounting wall,
      one or more neck portions extending from the toe portion through the strut toe opening and the flange toe opening, and a plurality of legs, wherein each leg is coupled to a respective neck portion at a distal leg junction, and wherein each leg extends laterally outward from the distal leg junction to a proximal leg junction at the sidewall.

8. The solar-tracking PV system of claim 7, wherein each leg extends parallel to the upper surface from the distal leg junction to a knee portion, and wherein each leg extends parallel to the sidewall from the knee portion to the proximal leg junction.

9. The solar-tracking PV system of claim 7, wherein the PV module clip further includes a plurality of retaining portions, wherein each retaining portion includes a hook-shaped portion extending from the proximal leg junction to a clip end between the sidewall and a vertical plane containing the axis.

10. The solar-tracking PV system of claim 9, wherein the strut further includes a retaining opening extending through the sidewall, and wherein one of the retaining portions extends laterally inward from a respective one of the proximal leg junctions through the retaining opening.

11. The solar-tracking PV system of claim 10, wherein the retaining opening includes an L-shaped slot.

12. The solar-tracking PV system of claim 9, wherein the hook-shaped portion includes a bend surface, wherein the sidewall includes a bottom edge, and wherein the bend surface is retained at the bottom edge of the sidewall.

* * * * *